(12) United States Patent
Chrisp

(10) Patent No.: US 7,808,635 B2
(45) Date of Patent: Oct. 5, 2010

(54) WIDE SWATH IMAGING SPECTROMETER UTILIZING A MULTI-MODULAR DESIGN

(75) Inventor: Michael P. Chrisp, Danville, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 252 days.

(21) Appl. No.: 12/199,575

(22) Filed: Aug. 27, 2008

(65) Prior Publication Data
US 2010/0053609 A1    Mar. 4, 2010

(51) Int. Cl.
*G01J 3/28* (2006.01)
(52) U.S. Cl. ........................... 356/326; 356/328
(58) Field of Classification Search ............... 356/328, 356/326
See application file for complete search history.

(56) References Cited

U.S. PATENT DOCUMENTS

| 5,276,321 | A | * | 1/1994 | Chang et al. ............... 250/226 |
| 5,420,681 | A | * | 5/1995 | Woodruff ................... 356/326 |
| 5,768,040 | A | * | 6/1998 | Macenka et al. ............ 359/859 |
| 7,016,037 | B2 | | 3/2006 | Chrisp et al. |
| 7,041,979 | B2 | | 5/2006 | Chrisp |
| 7,239,386 | B2 | | 7/2007 | Chrisp et al. |
| 2005/0073680 | A1 | | 4/2005 | Chrisp et al. |
| 2007/0171415 | A1 | | 7/2007 | Chrisp |

\* cited by examiner

*Primary Examiner*—L. G Lauchman
(74) *Attorney, Agent, or Firm*—Eddie E. Scott; John H. Lee

(57) ABSTRACT

A wide swath imaging spectrometer utilizing an array of individual spectrometer modules in the telescope focal plane to provide an extended field of view. The spectrometer modules with their individual detectors are arranged so that their slits overlap with motion on the scene providing contiguous spatial coverage. The number of modules can be varied to take full advantage of the field of view available from the telescope.

14 Claims, 10 Drawing Sheets

WIDE SWATH IMAGING SPECTROMETER UTILIZING A MULTI-MODULAR DESIGN

The United States Government has rights in this invention pursuant to Contract No. DE-AC52-07NA27344 between the United States Department of Energy and Lawrence Livermore National Security, LLC for the operation of Lawrence Livermore National Laboratory.

CROSS-REFERENCE TO RELATED APPLICATIONS

The invention in this application is related to inventions disclosed and claimed in United States Published Patent Application 2005/0073680 for an Imaging Spectrometer Utilizing Immersed Gratings with Accessible Entrance Slit by Michael P. Chrisp et al published Apr. 7, 2005, now U.S. Pat. No. 7,016,037 issued Mar. 21, 2006. The invention in this application has new improved designs including smaller sizes with wider fields of view compared with those previously disclosed.

BACKGROUND

1. Field of Endeavor

The present invention relates to an imaging spectrometer, and more particularly to an arrangement of compact imaging spectrometer modules designed to achieve a wide swath for a pushbroom imaging spectrometer.

2. State of Technology

U.S. Pat. No. 5,717,487 provides the following state of technology information: "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter."

United States Patent Application No. 20020135770 published Sep. 26, 2003 provides the following state of technology information: "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 provides the following state of technology information: "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 $cm^{-1}$ This provides for maximum sensitivity to simple molecules with the narrowest spectral features, allows for corrections for the presence of atmospheric constituents, maximizing species selectivity, and provides greater opportunity to detect unanticipated species."

U.S. Pat. No. 5,880,834 provides the following state of technology information: "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention details a wide swath width imaging spectrometer design built from a modular arrangement of miniature imaging spectrometers. One important feature of this modular approach is that it enables the imaging spectrometers to be assembled to match the full swath width available from the telescope, and can be utilized with existing detector arrays, without the requirement for larger format array development.

These compact arrangements of the imaging spectrometers modules use smaller cryogenic coolers, in the case of infrared systems, facilitating their use in small, medium, and large manned and unmanned aerial vehicles for remote gas detection and detection of solids with characteristic spectral features in the longwave or midwave infrared regimes. These instruments have application for Homeland Defense to check for the presence of potential WMD production and/or use activities without entering the contaminated areas. They also have application for space sensors, where the wide-swath width is extremely important because scenes can only be viewed once an orbit The wider field of view of this design enables larger swath widths for the remote sensing of larger areas with single pass overflights, and additional spectrometer modules can be added until the field of view of the telescope is completely utilized.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims. This invention can be adapted to different spectral regions by suitable choice of refractive and reflective materials, and with different detector arrays.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
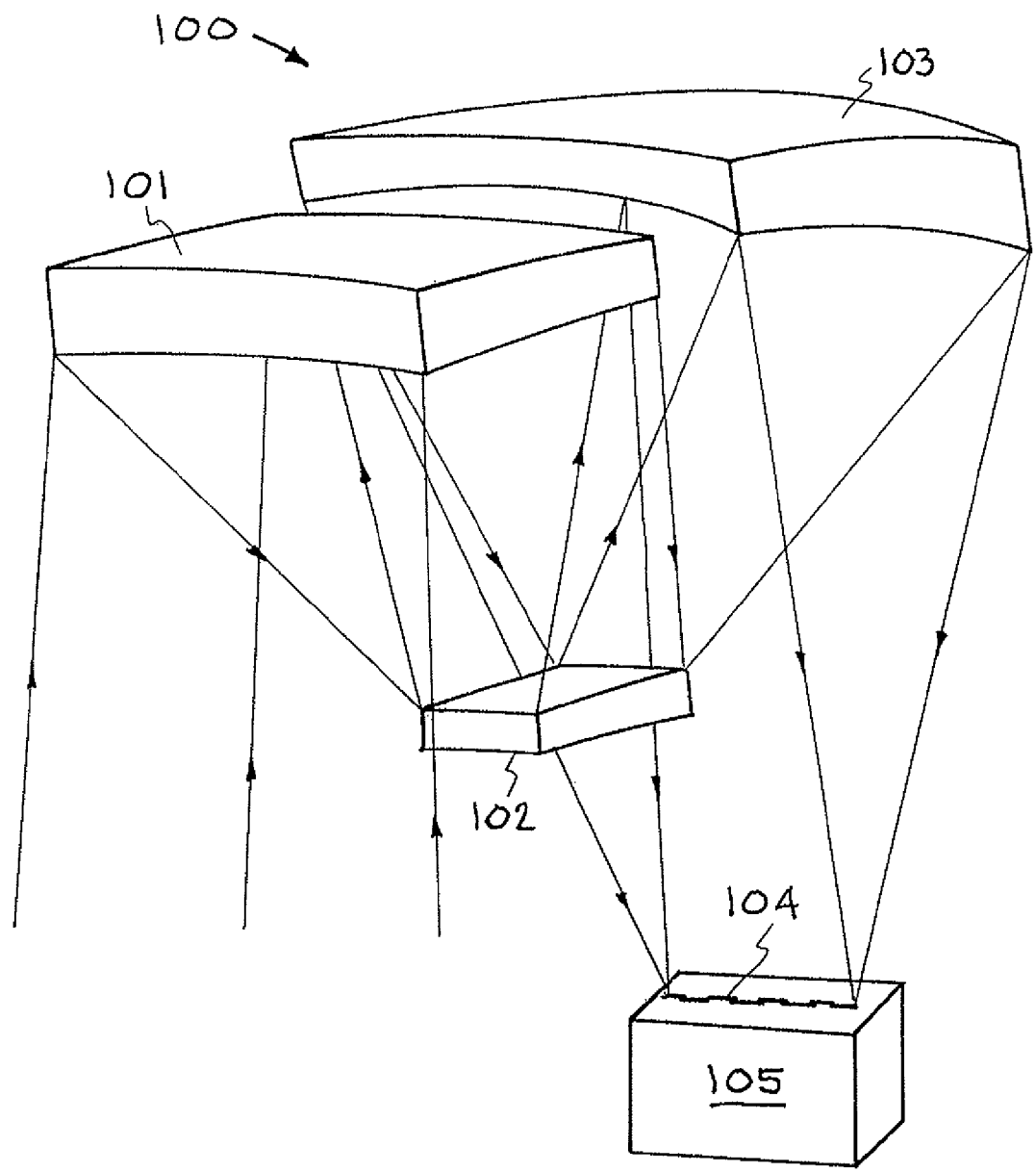
FIG. 1 illustrates an embodiment of a wide swath imaging spectrometer constructed in accordance with the present invention with eight imaging spectrometer modules arranged in the focal plane of a wide field reflective telescope.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

There is a need for wide swath width hyperspectral remote sensing systems so that whole facilities can be scanned in one flyby. These enable a larger area of ground to be scanned, and in the case of identifying areas of interest, a high resolution imaging device can be cued in quickly. Utilizing existing detectors, the Applicant has developed an approach for wide swath width systems by assembling multiple spectrometers at the telescope's focal plane. This is an enabling technology, because previous imaging spectrometer designs have not been small enough to be used in arrays. The spectrometer design for Applicants' arrangement has to be less than two times the entrance slit width, and previous spectrometer designs have not achieved this at fast enough f-numbers.

Referring now to the drawings and in particular to FIG. 1, one particular embodiment of a wide swath imaging spectrometer based on a modular arrangement of the spectrometers is illustrated. The optical system consists of a wide-field reflective three mirror anastigmat telescope (primary mirror 101, secondary mirror 102, and tertiary mirror 103) coupled to the eight long wave infrared (LWIR) imaging spectrometer modules (105) arranged in two rows in the telescope's focal plane, so that their entrance slits (104) overlap across the swath width. The optical elements for the spectrometers are mounted in a dewar housing, which is required for cooling to reduce the infrared background and for the detectors' operating temperature.

Figure 2:
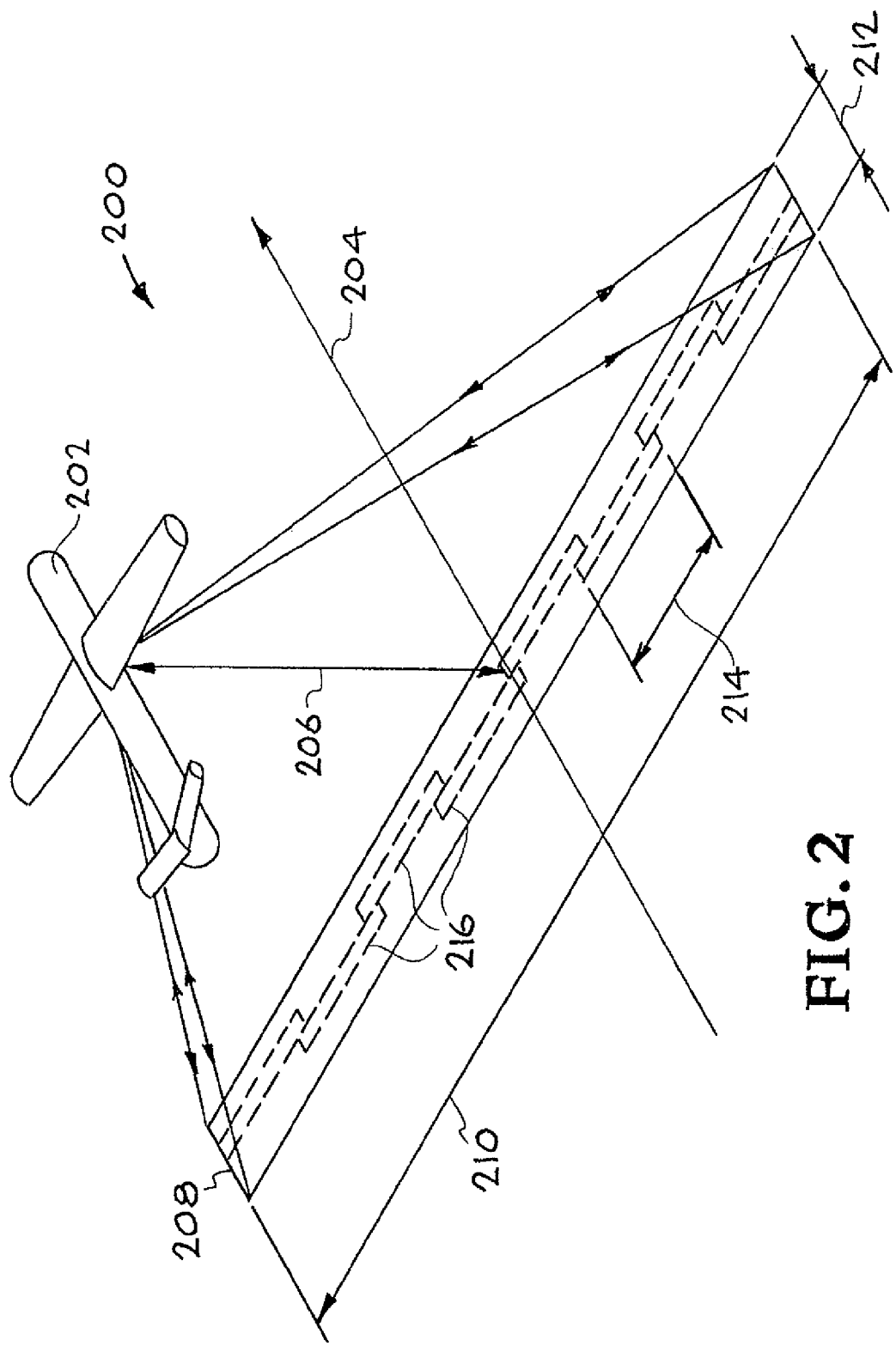
FIG. 2 illustrates the imaging spectrometer slits projected on the ground from an embodiment of a wide swath imaging spectrometer constructed in accordance with the present invention utilizing a multi-modular design.

For illustrative purposes, shown in FIG. 2 is a diagram (200) of how the wide-swath imaging spectrometer 100 in FIG. 1 is mounted in the airplane 202 for pushbroom imaging. The eight imaging spectrometer modules are arranged so that the images (216) of their entrance slits overlap when projected onto the ground (208) as shown in FIG. 2. The two rows (212), of four spectrometers each are staggered, so that their slit ends (214) overlap by 5 pixels. This ensures that when they are swept over the ground, either by the aircraft motion, or by a pointing mechanism or additional scan mirror, there are no gaps in the spatial coverage. A similar arrangement would be used if the wide swath imaging spectrometer was mounted in an orbiting satellite.

The wide-swath imaging spectrometer 100 shown in FIG. 1 and FIG. 2 is adapted to be mounted in a vehicle 202 having a flight path 204 to obtain coverage (206) of a scene (208). The wide-swath imaging spectrometer 100 includes a multiplicity of imaging spectrometer modules. Each of the spectrometer modules has entrance slits and the spectrometer module assembly is optionally movable providing spectrometer angular scan motion. A wide field telescope is operatively connected to the imaging spectrometer modules. The multiplicity of imaging spectrometer modules are arranged in adjacent rows wherein the entrance slits overlap thereby providing contiguous spatial coverage (210) of the scene (208) along the flight path (204) or providing contiguous spatial coverage of the scene from spectrometer angular motion or both.

In one embodiment, each of the spectrometer modules includes a catadioptric lens, a dioptric lens, an immersion grating, and a detector array, the entrance slit, the catadioptric lens, the dioptric lens, the immersion grating, and the detector array positioned wherein the entrance slit transmits light to the catadioptric lens, the catadioptric lens refracts and reflects the light to the immersion grating, and the immersion grating disperses and directs the light to the catadioptric lens, the catadioptric lens transmits and refracts light to the dioptric lens, the dioptric lens focuses and directs light to the detector array. In another embodiment, each of the spectrometer modules wherein the entrance slit transmits light, and including a catadioptric lens, an immersion grating, and a detector array, the entrance slit, the catadioptric lens, the immersion grating, and the detector array positioned are wherein the entrance slit transmits light to the catadioptric lens, the catadioptric lens refracts and reflects the light to the immersion grating, and the immersion grating disperses and directs the light to the catadioptric lens, and the catadioptric lens focuses and directs light to the detector array.

The parameters for the optical system with the eight imaging spectrometer modules are given Table 1 below.

TABLE 1

Optical Design Parameters

| | |
|---|---|
| Altitude | 20,000 ft |
| Ground IFOV | 1.5 m |
| Total Cross Track Swath | 3 km (28.3 degrees) |
| Entrance pupil width (square) | 4.6 cm |
| Effective Focal Length | 16.26 cm |
| Number of spectrometers | 8 |
| Spectral Range | 7.5-13.5 microns |
| Combined number of spatial pixels cross-track | 2048 |
| Length of spectra on detector array | 128 pixels (or 256 pixels) |
| F-number (square pupil) | 3.5 |
| Detector array for each individual spectrometer module | 256 spatial × 128 spectral or (256 spatial × 256 spectral) |
| Pixel size | 40 microns |
| Entrance slit length | 10.24 mm (for single spectrometer) |
| Spatial distortion: change in spatial mapping with wavelength (keystone on detector) | <0.1 pixel (interpreted as <±2 microns) |
| Spectral distortion: spectral smile | <0.1 pixel (interpreted as <±2 microns) |
| Optical performance | diffraction limited for all wavelengths |
| Ghost level | <0.1% of primary image |

Figure 3:
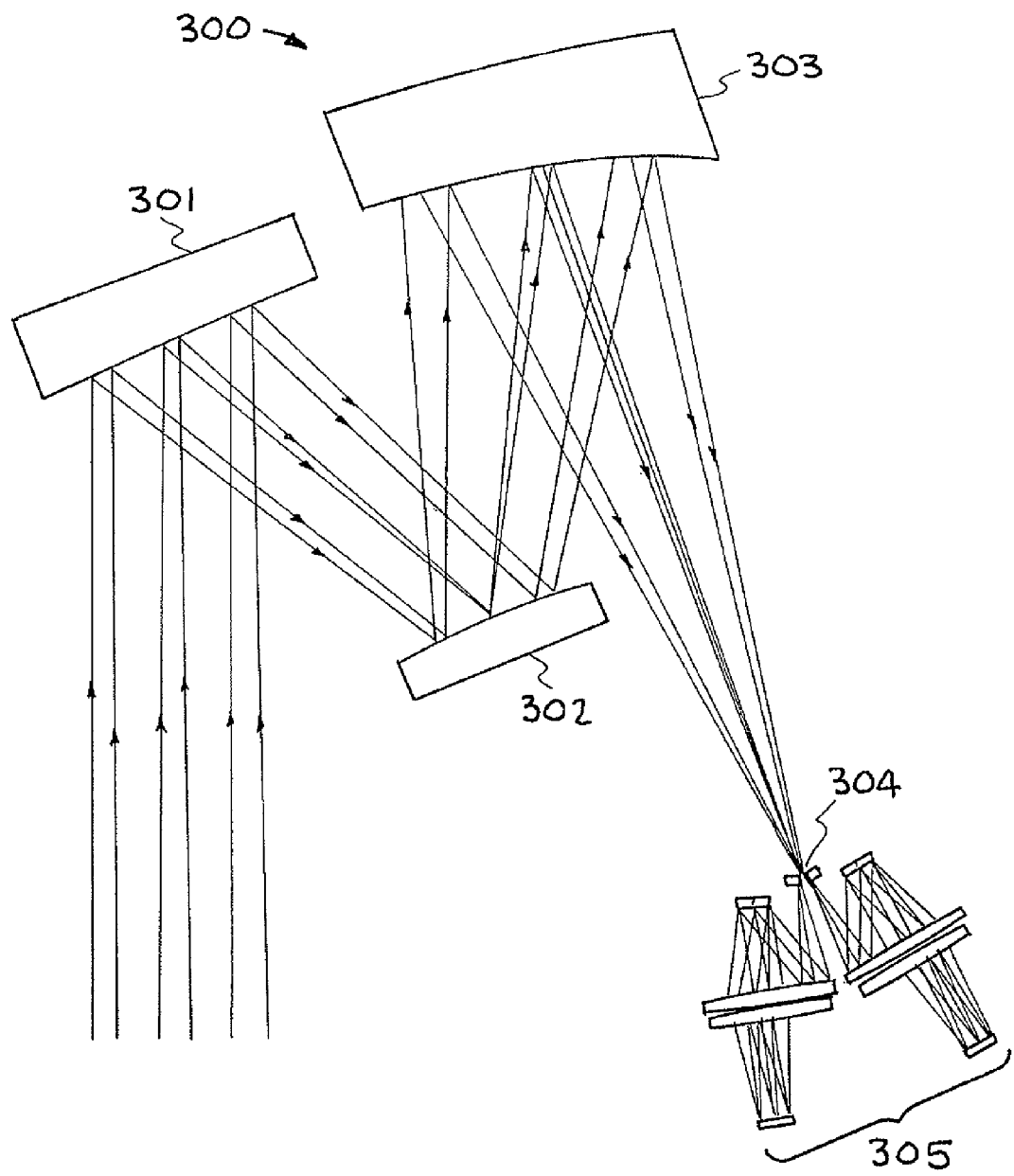
FIG. 3 illustrates the side elevation view of an embodiment of a wide swath imaging spectrometer with the two rows each of four compact imaging spectrometer modules arranged in the focal plane.

The f/3.5 three mirror anastigmat telescope is diffraction limited over the 28.3 degrees field of view, and has a square entrance pupil with a width and height of 4.6 cm. A raytrace of the telescope 300 is shown in FIG. 3, with the mirrors (301, 302 and 303). The mirrors are diamond turned aluminum and are mounted in an aluminum structure, providing a monometallic system which is athermal because of equal expansion of the mirror and structure together. This telescope provides a flat focal plane so that the spectrometer slits 304 can be in the same plane, simplifying their mechanical assembly to a common optical bench. The telescope also provides a telecentric exit pupil, matching the input requirements for the spectrometer modules, so that the pupil images of the cold stops in the spectrometer modules coincide with the secondary mirror (302) of the telescope. This decentered aperture telescope, without obscuration, ensures minimal thermal background because only the low emittance mirror surfaces are in the field of view of spectrometer modules.

The view in FIG. 3 shows the end-on view of the two rows of spectrometers, facing each other and tilted together placing the two rows of spectrometer slits (304) close together, minimizing the delay on the ground between the two rows of slits to sweeping over a line of the scene. The optical elements of the spectrometers (305) are shown in FIG. 3, and in detail in FIG. 4B.

Figure 4A:
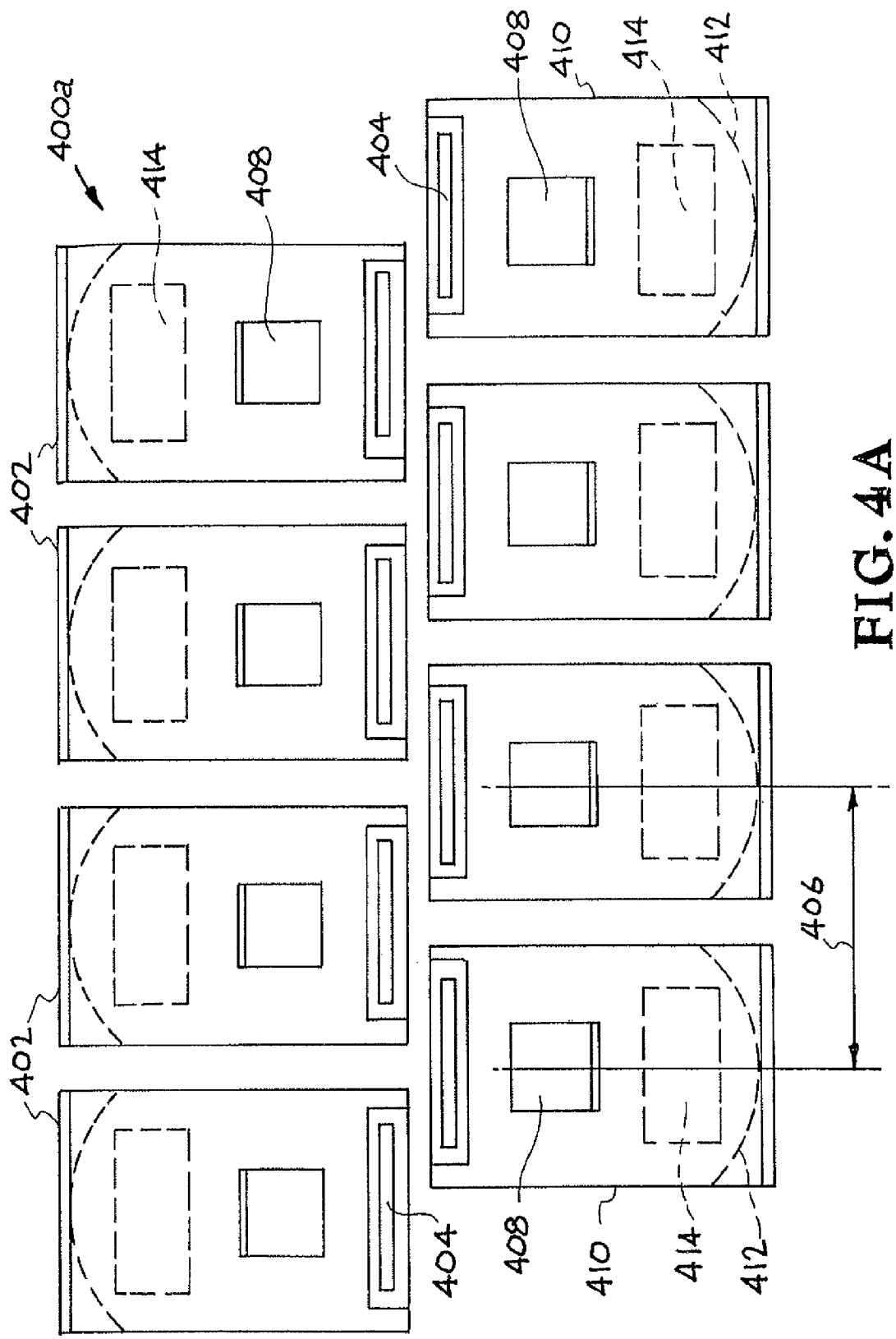
FIG. 4A illustrates an embodiment of the arrangement of the eight imaging spectrometer modules to provide an equivalent coverage of 2048 spatial pixels by 256 spectral pixels. The slits from the two rows of spectrometers are staggered to provide overlap when swept out on the ground.
Figure 4B:
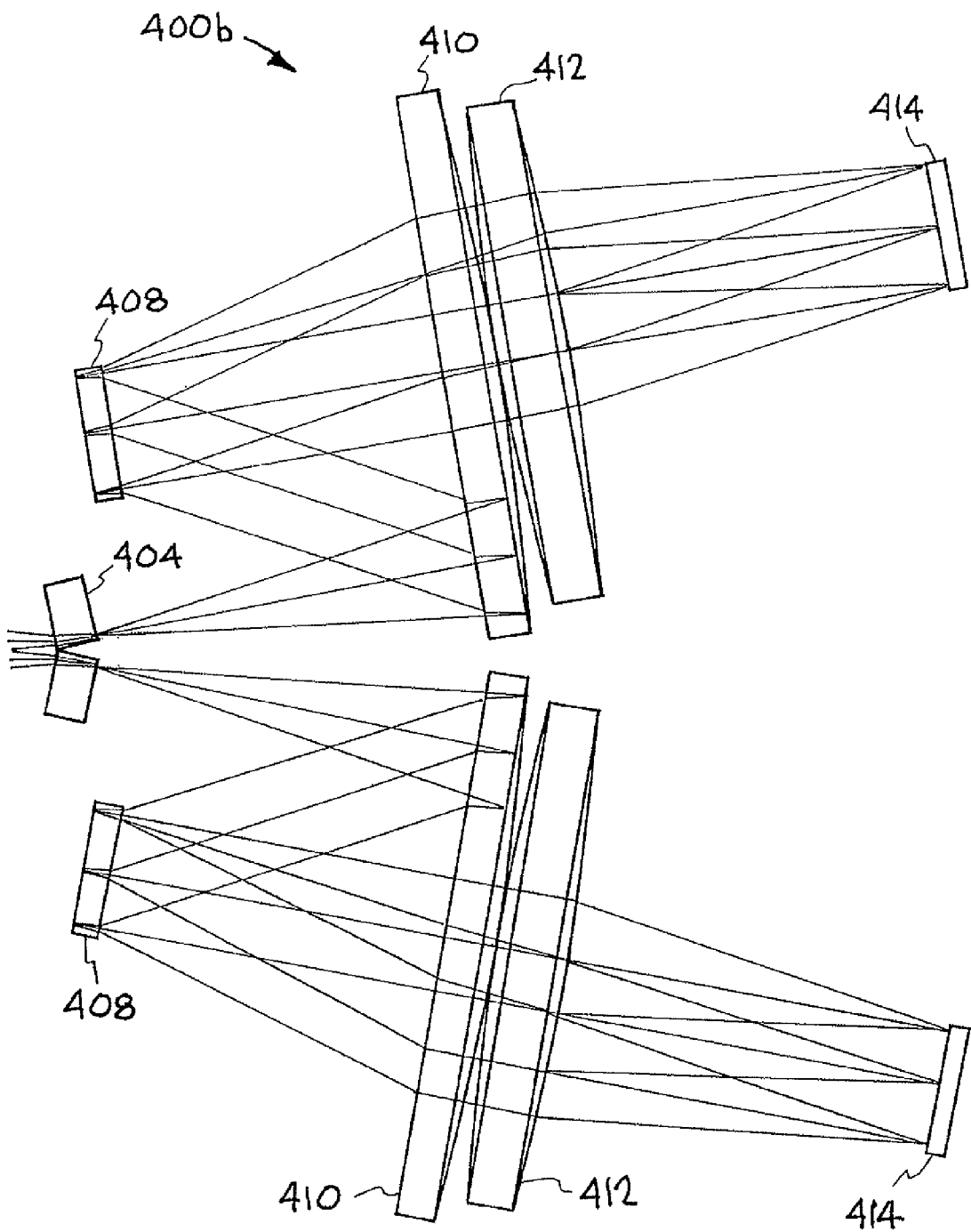
FIG. 4B is a side elevation view of an embodiment of the arrangement of the eight imaging spectrometer modules to provide contiguous spatial coverage over the full swath width.

The detailed modular arrangement (400a) of the spectrometer modules is shown in FIG. 4A, looking down onto the spectrometers (402) at their entrance slits (404), and in FIG. 4B, the side elevation view of the two rows of spectrometers, with the same element numbering scheme for both views. This two row mounting scheme is made possible because the width of each imaging spectrometer module is less than twice the entrance slit width, enabling the slits to overlap in the pushbroom mode, so there are no gaps in the spatial coverage as the two rows of slits are swept across the ground. Enabling this approach is the design efficiency of our compact catadioptric spectrometers (U.S. Pat. No. 7,016,037 and U.S. Pat. No. 7,414,719), were for reasonable f-numbers up to about f/2 the spectrometer width is less than the twice the entrance slit width. This also minimizes the overall volume of the spectrometer package, which is important for infrared systems, where the spectrometers are cooled, because the cooling power requirements and cool-down time for the spectrometers is reduced.

Each imaging spectrometer module is identical with its own entrance slit, complete dispersive optical system with grating (408), and detector (414). In FIG. 4B the spectrometers in the upper row are just flipped with respect to those in the lower row, to make their entrance slits adjacent.

Shown in FIG. 4B is the raytrace (400b) for the optical arrangement of the imaging spectrometer modules. The light enters through the entrance slit (404), ahead of which is a cold filter. In this case, where the spectrometer axes have been inclined to place their entrance slits as close as possible, wedging the cold filters (404) directs the light from the telescope's telecentric exit beam correctly along these inclined axes. Other more complex prism shaped cold filters can be used, when the optical spacing between the images of the two rows of slits must be reduced to the absolute minimum.

Passing through the entrance slit (404) the light goes to the catadioptric lens (410) reflecting off its back surface which is covered by a reflective gold coating in this area (the upper half of the lens). Emerging from the lens the light is refracted to the immersion grating (408), passing into the wedged grating to be dispersed by its reflective diffractive rulings on its back surface. The dispersed light from the grating is refracted through the lower half of the catadioptric lens (410), passing through an antireflection coating on the lower half of the lens. Then the light beams are focused by the dioptric lens (412) onto the detector array (414), with the dispersed wavelengths in one direction on the array the spatial information focused in the perpendicular arrangement. The entrance slit (404) is dispersively imaged onto the detector array at each of the different wavelengths. The extent of the light bundles passing through the spectrometer module are defined by a cold stop aperture adjacent to the entrance surface of the immersion grating (408). This real cold stop limits the light beams reaching the detector to the reflective area of the telescope mirrors, and cuts out the light from the high emittance telescope structure.

Looking down at the imaging spectrometer modules in FIG. 4A, the unused sides of the lenses have been removed, to enable closer packaging of the spectrometers. Thus the lenses have flat sides, and either circular or a combination of circular and rectangular top and bottom surfaces to facilitate mounting and centering, shown particular clearly in the isometric view of the spectrometer in FIG. 7.

Figure 5:
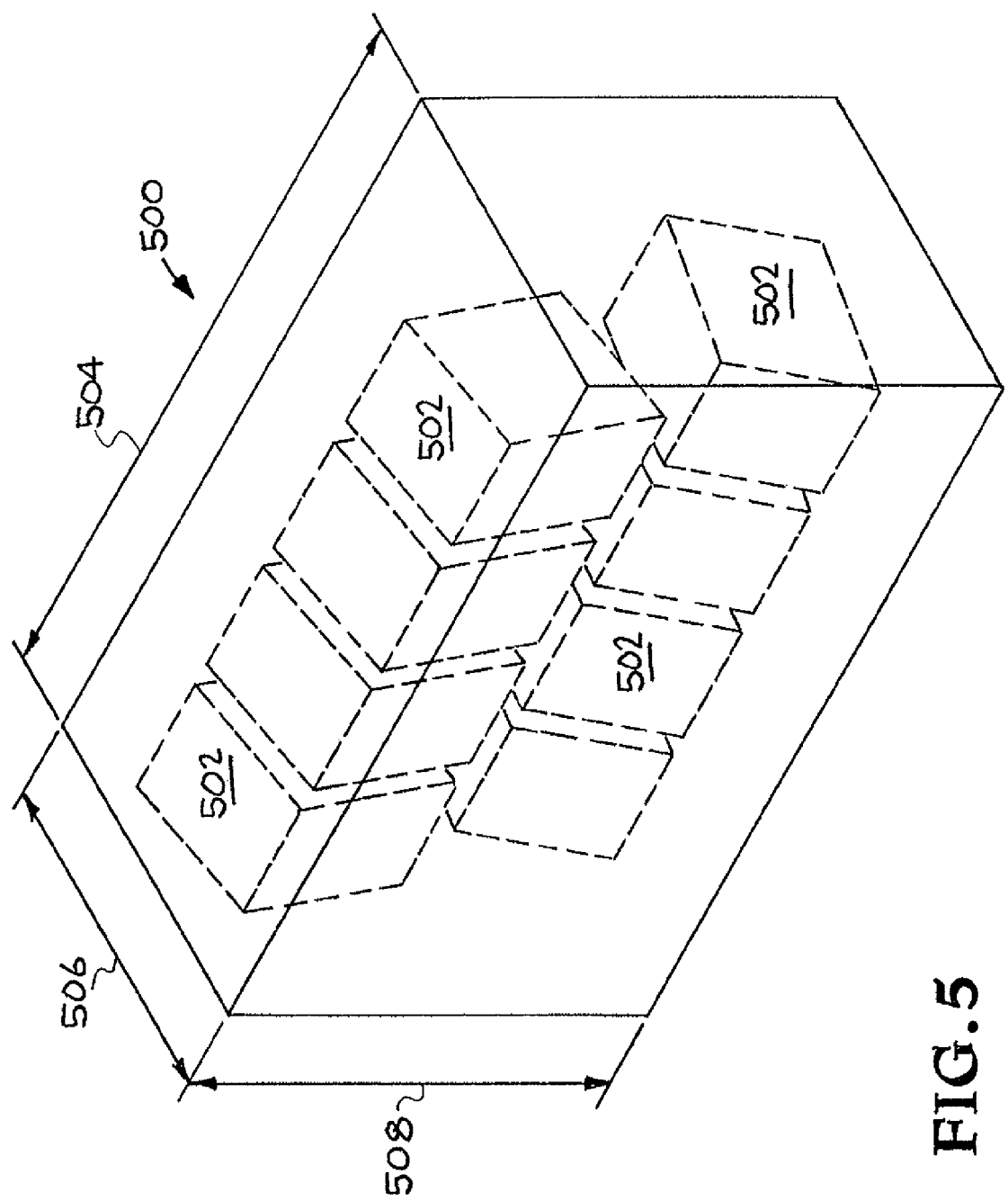
FIG. 5 is an isometric view of an embodiment of the eight imaging spectrometer modulators illustrating the size of the optical package.

Shown in FIG. 5 is an isometric view of the packaging of the spectrometer modules (502). The dimension along the swath width (504) is 9 cm., the dimension perpendicular to this (508) is 5 cm., and the dimension for the depth of the package (506) is 6.1 cm. The packaged volume of these spectrometers is orders of magnitude smaller than possible with previous spectrometer designs for this spatial coverage and etendue.

The arrangement (500) of the spectrometer modules (502) in FIG. 5 is flexible, so that more spectrometer modules can be added to cover larger swath widths. If the telescope has a curved focal surface, then the bench that the modules are mounted to can be similarly shaped to so that the entrance slit for each of the spectrometer modules is placed at the best focus position for field position it occupies (504 length, 506 width, 508 height). This would have application in Schmidt type or two mirror telescope designs, which naturally have curved focal planes, and would avoid the use of additional field flattening lenses. In the case where the telescope does not have a telecentric exit pupil, field lenses can be mounted directly ahead of the spectrometer slits (or the cold filters can be turned into field lenses), changing the exit pupil position, so the light entering the spectrometers is telecentric.

The identical imaging spectrometer modules can be manufactured and tested separately, enabling the rapid production of multiple units. Also, should problems arise during the test and operation of the complete assembly, kinematic mounting of these imaging spectrometer modules will enable their easy replacement, minimizing the schedule impact.

Figure 6:
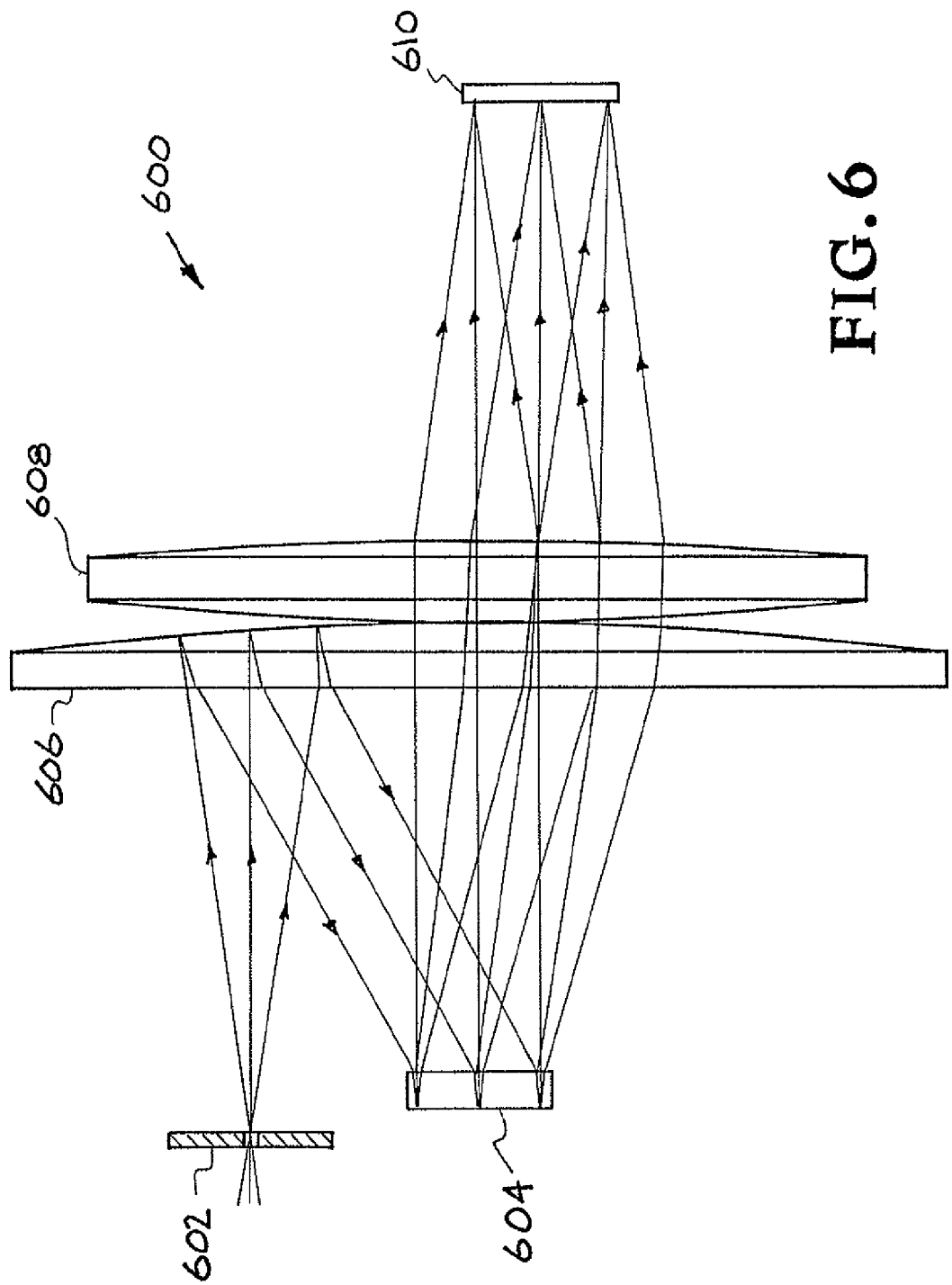
FIG. 6 illustrates an embodiment of the raytrace of the imaging spectrometer module designed for 256 spatial pixels by 128 spectral pixels.

Illustrated in detail in FIG. 6 is a raytrace of one of the spectrometer modules used in the wide-swath imaging spectrometer in FIG. 1. The cold filter ahead of the entrance slit (602) has been omitted. Light enters the spectrometer through the entrance slit (602) and is refracted and reflected off catadioptric lens (606) to the immersion grating (604). The gratings reflective rulings disperse the light and it is refracted out of the grating to catadioptric lens (606), which refracts the light and this time passes through it to dioptric lens (608). Dioptric lens (608) then focuses the light onto the detector array (610). In this embodiment the entrance beams to the spectrometer module are approximately telecentric, and the exit beams to the detector array are approximately telecentric. A square cold stop immediately in front of the immersion grating (604) defines the extent of the beams passing through the spectrometer module. This particular spectrometer is designed for long wave infrared radiation and the grating and lenses are made out of germanium. Other optical materials may be used as most appropriate for other wavelength ranges.

Figure 7:
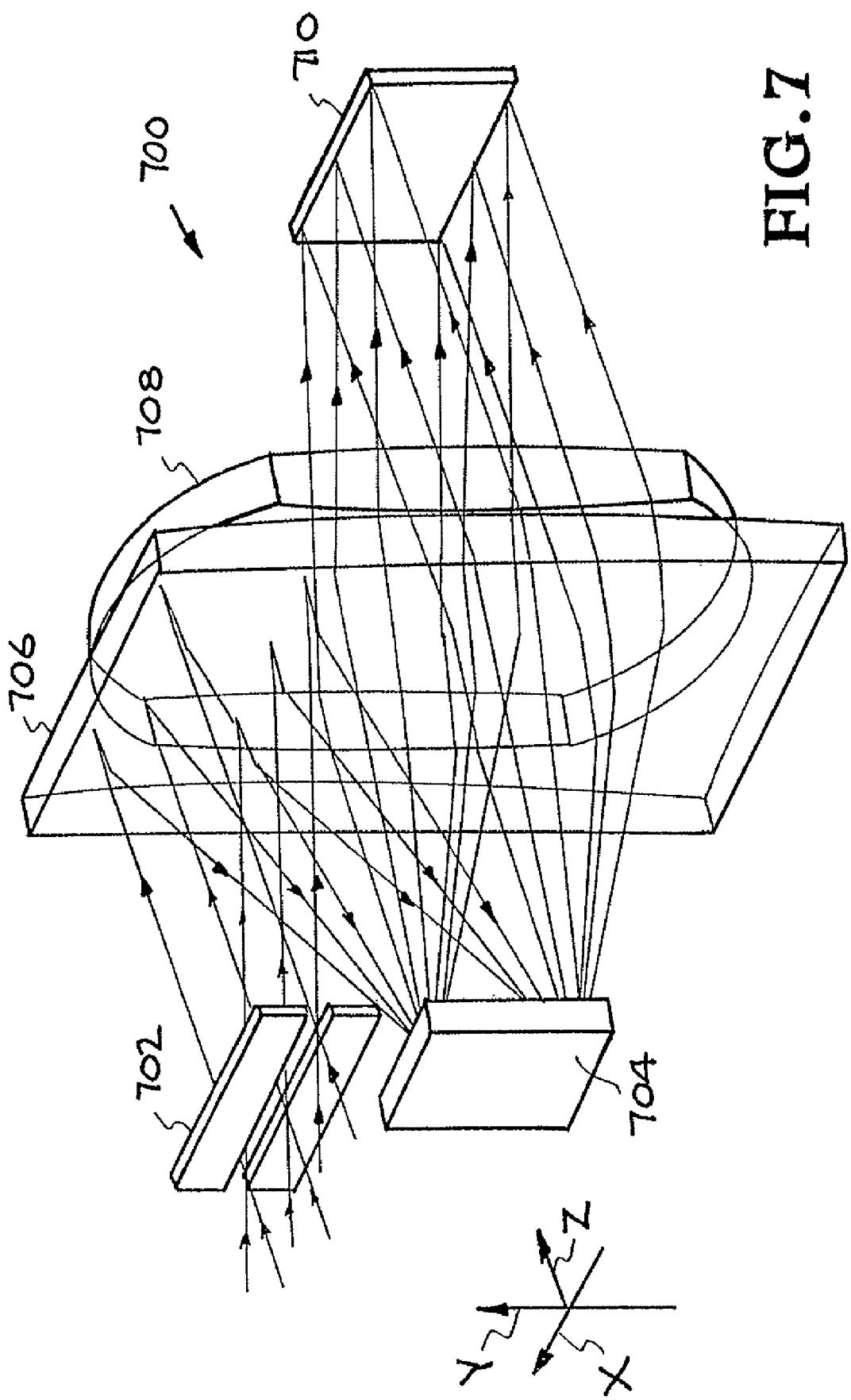
FIG. 7 illustrates an embodiment of the isometric raytrace of the imaging spectrometer modules designed for 256 spatial pixels by 128 spectral pixels.

Illustrated in detail in FIG. 7 is an isometric view of the raytrace (700) of one of the spectrometer modules used in the wide-swath imaging spectrometer in FIG. 1, which was described in detail in FIG. 6. Light enters the spectrometer through the entrance slit (702), is refracted and reflected off catadioptric lens (706), dispersed by immersion grating (704), then refracted and focused by catadioptric lens (706) and dioptric lens (708) to the detector array (710). On the detector array the light is dispersed in wavelength along the Y-axis, and the spectrometer slit is imaged spatially along the X-axis. The viewpoint in FIG. 7 shows how efficient in the X-axis, the width of the spectrometer is to the length of the slit. Having the width of the spectrometer less than the twice the slit length is the key to being able to provide full spatial coverage from the two staggered rows of spectrometers. The unused side of lenses (706) and (708) have been removed to enable this close spacing, or rectangular shaped lens forms can also be used instead.

Figure 8:
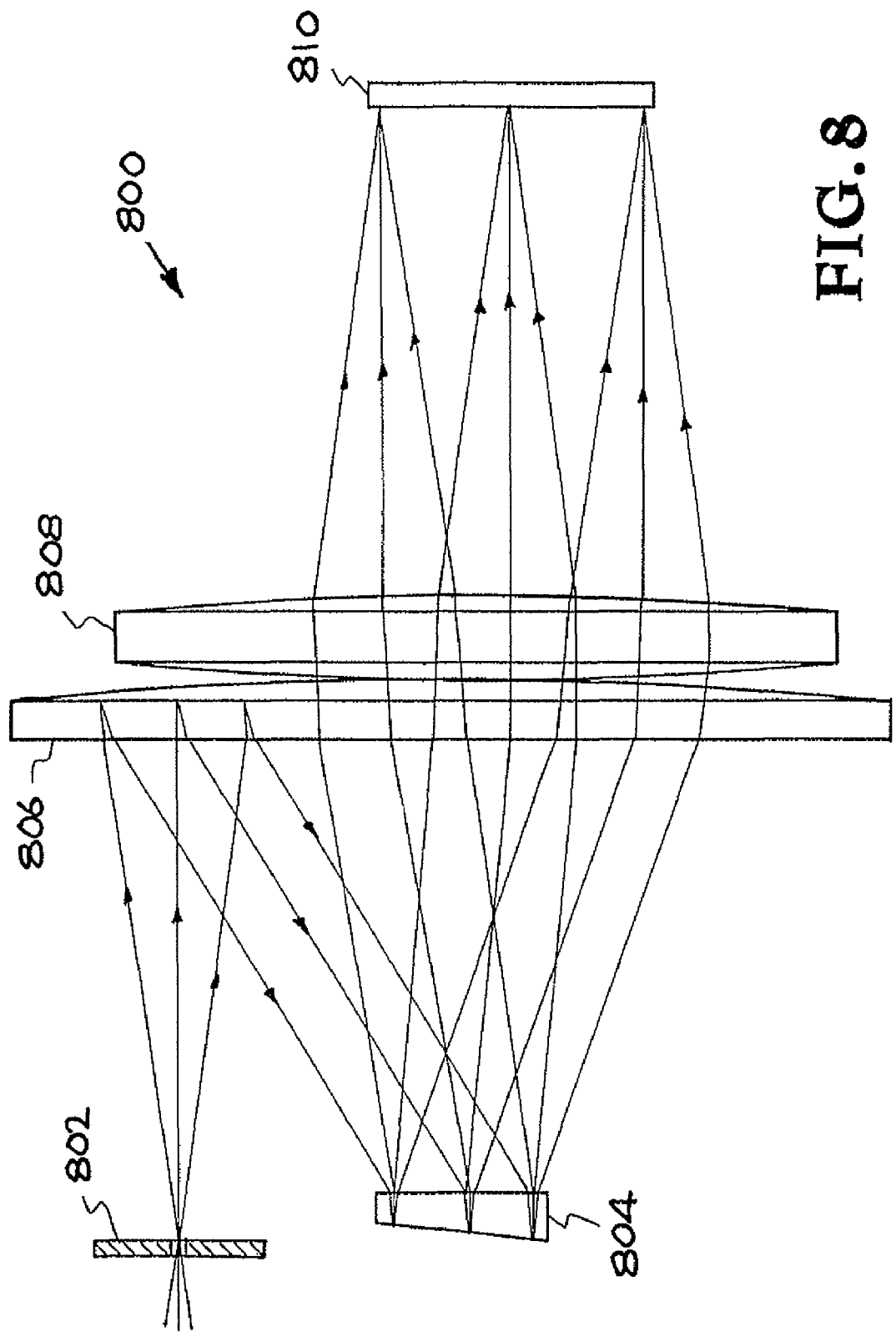
FIG. 8 illustrates an embodiment of the raytrace of the imaging spectrometer module designed for 256 spatial pixels by 256 spectral pixels.

The wide swath imaging spectrometer in FIG. 1 has been arranged with different spectrometer modules to meet different requirements. Shown in detail in FIG. 8 is a raytrace (800) of one of the other spectrometer modules that have been used in modular arrangement in the focal plane. This spectrometer module had twice the dispersion of that in FIG. 6. whose parameters are given in Table 1. For the spectrometer module in FIG. 8 the same wavelength range is dispersed over 256 spectral detectors, compared with 128 spectral detectors for FIG. 6. Light enters the spectrometer through the entrance slit (802), is refracted and reflected off catadioptric lens (806), dispersed by immersion grating (804), then refracted and focused by catadioptric lens (806) and dioptric lens (808) to the detector array (810). The overall length of this spectrometer module in the Z-axis is slightly larger than that in FIG. 7.

Figure 9:
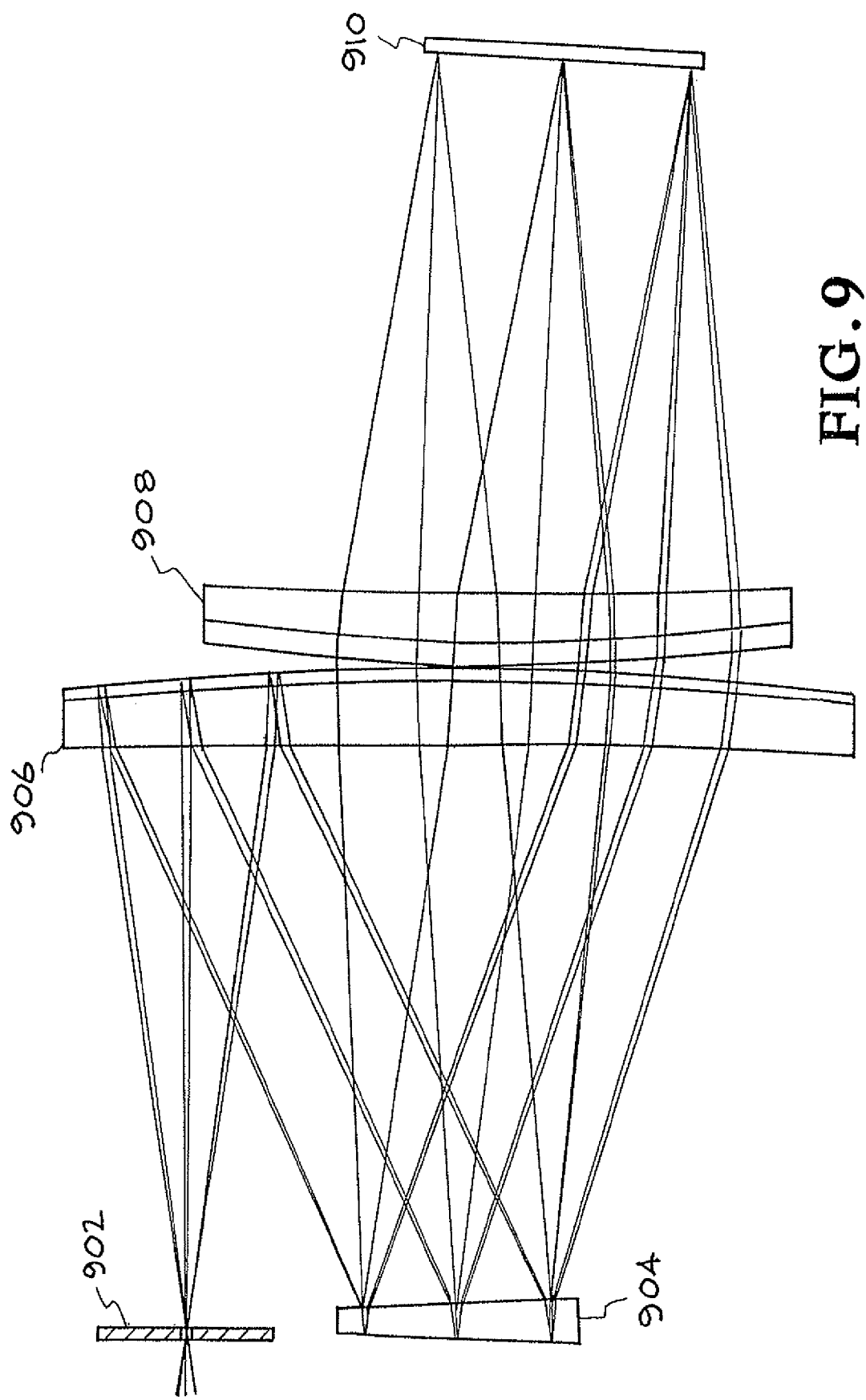
FIG. 9 illustrates an embodiment of the mid-wave infrared (MWIR) image spectrometer based on an adaptation of an imaging spectrometer module design.

The wide-swath imaging spectrometer in FIG. 1 has also been arranged with different spectrometer modules to cover different wavelength ranges, illustrated by its use to the mid-wave infrared. In FIG. 9 is shown a raytrace for a successful modification to the design in FIG. 6, which has been adapted for use for the mid-wave infrared wavelength range 3.2 to 5.3 microns. This was done by using silicon for the two lenses (906, 908) and germanium for the grating (904), alternative material choices such as silicon for grating also worked but are considered harder to fabricate. Alternate optical material choices can be made depending upon the wavelength range of interest. This design utilizes a detector array with 640 by 480 pixels, with 640 pixels along the slit in the spatial dimension and 480 pixels in the spectral dimension, with a pixel size of 27 microns. Light enters the spectrometer through the entrance slit (902), is refracted and reflected off catadioptric lens (906), dispersed by immersion grating (904), then refracted and focused by catadioptric lens (906) and dioptric lens (908) to the detector array (910).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A pushbroom wide swath imaging spectrometer apparatus adapted to be mounted in a vehicle having a flight path to obtain coverage of a scene, comprising:
   a spectrometer modules assembly having a multiplicity of imaging spectrometer modules, each of said spectrometer modules having slits and said spectrometer module assembly having optional spectrometer angular scan motion; and
   a wide field telescope operatively connected to said imaging spectrometer modules;
   wherein said multiplicity of imaging spectrometer modules are arranged in adjacent rows,
   wherein said slits overlap thereby providing contiguous spatial coverage of the scene along the flight path or providing contiguous spatial coverage of the scene from spectrometer angular motion or both.

2. The pushbroom wide swath imaging spectrometer apparatus of claim 1 including a scanning mirror operatively connected to said imaging spectrometer modules and said wide field telescope, said scanning mirror providing contiguous spatial coverage of the scene.

3. The pushbroom wide swath imaging spectrometer apparatus of claim 1 wherein said wide field telescope has a curved focal surface, and including an optical bench wherein said spectrometer modules are mounted on said optical bench to match said wide field telescope curved focal surface.

4. The pushbroom wide swath imaging spectrometer apparatus of claim 1 wherein said wide field telescope has a curved focal surface and including an optical bench wherein said spectrometer modules are mounted on said optical bench with each said spectrometer module slit optimally matching said wide field telescope curved focal surface.

5. The pushbroom wide swath imaging spectrometer apparatus of claim 1 including field lenses mounted in front of said slits of said spectrometer modules.

6. The pushbroom wide swath imaging spectrometer apparatus of claim 5 wherein said spectrometer modules include cold stops and said wide field telescope includes an exit pupil, and wherein said field lenses reimage said wide field telescope exit pupil onto said cold stops.

7. A pushbroom wide swath imaging spectrometer apparatus adapted to be mounted in a vehicle having a flight path to obtain coverage of a scene, comprising:
   a first assembly of imaging spectrometer modules, each of said first assembly spectrometer modules having first assembly slits and each of said first assembly spectrometer modules having angular motion;

a second assembly of imaging spectrometer modules, each of said second assembly spectrometer modules having second assembly slits and each of said second assembly spectrometer modules having angular motion; and a wide field telescope operatively connected to said first assembly of imaging spectrometer modules and operatively connected to said second assembly of imaging spectrometer modules;

wherein said first assembly of imaging spectrometer modules and said second assembly of imaging spectrometer modules are arranged in adjacent rows, wherein said first assembly slits and said second assembly slits overlap thereby providing contiguous spatial coverage of the scene along the flight path or providing contiguous spatial coverage of the scene from first assembly and second assembly spectrometer angular motion or both.

8. The pushbroom wide swath imaging spectrometer apparatus of claim 1 wherein light is directed to said first assembly of imaging spectrometer modules and to said second assembly of imaging spectrometer modules, and including a beamsplitter operatively positioned to split said light, wherein said first assembly of imaging spectrometer modules views the scene with the light transmitted through the beam splitter, wherein said second assembly of imaging spectrometer modules views the scene with the light reflected off the beamsplitter.

9. The pushbroom wide swath imaging spectrometer apparatus of claim 1 wherein light is directed to said first assembly of imaging spectrometer modules and to said second assembly of imaging spectrometer modules, and including a beamsplitter operatively positioned to split said light, wherein said first assembly of imaging spectrometer modules views the scene with the light reflected or refracted from said beamsplitter, and wherein said second assembly of imaging spectrometer modules views the scene with the light reflected or refracted from said beamsplitter.

10. A pushbroom wide swath imaging spectrometer apparatus adapted to be mounted in a vehicle having a flight path to obtain coverage of a scene, comprising:

a wide field telescope, a multiplicity of imaging spectrometer modules operatively connected to said wide field telescope, each of said spectrometer modules having entrance slits and each of said spectrometer modules having spectrometer angular motion, said multiplicity of imaging spectrometer modules arranged in adjacent rows wherein said entrance slits overlap thereby providing contiguous spatial coverage of the scene along the flight path or providing contiguous spatial coverage of the scene from spectrometer angular motion or both.

11. The pushbroom wide swath imaging spectrometer apparatus of claim 10 wherein each of said spectrometer modules wherein said entrance slit transmits light, and including:
a catadioptric lens,
an immersion grating, and
a detector array,
said entrance slit, said catadioptric lens, said immersion grating, and said detector array positioned are wherein said entrance slit transmits light to said catadioptric lens, said catadioptric lens refracts and reflects said light to said immersion grating, and said immersion grating disperses and directs said light to said catadioptric lens, and said catadioptric lens focuses and directs light to said detector array.

12. The pushbroom wide swath imaging spectrometer apparatus of claim 10 wherein each of said spectrometer modules wherein said entrance slit transmits light, and including:
a catadioptric lens,
a dioptric lens,
an immersion grating, and
a detector array,
said entrance slit, said catadioptric lens, said dioptric lens, said immersion grating, and said detector array are positioned wherein,
said entrance slit transmits light to said catadioptric lens, said catadioptric lens refracts and reflects said light to said immersion grating, and said immersion grating disperses and directs said light to said catadioptric lens, said catadioptric lens transmits and refracts light to said dioptric lens, said dioptric lens focuses and directs light to said detector array.

13. The pushbroom wide swath imaging spectrometer apparatus of claim 10 wherein each of said spectrometer modules wherein said entrance slit transmits light, and including:
a catadioptric lens,
a dioptric lens,
a reflective grating, and
a detector array,
said entrance slit, said catadioptric lens, said dioptric lens, said reflective grating, and said detector array are positioned wherein,
said entrance slit transmits light to said catadioptric lens, said catadioptric lens refracts and reflects said light to said reflective grating, and said immersion grating disperses and directs said light to said catadioptric lens, said catadioptric lens transmits and refracts light to said dioptric lens, said dioptric lens focuses and directs light to said detector array.

14. The pushbroom wide swath imaging spectrometer apparatus of claim 12 including an optional refractive corrective element, wherein additional distortion is compensated by offsetting, tilting and wedging said catadioptric and said dioptric lenses, with said refractive corrective element next to said reflective grating.

* * * * *